Nov. 8, 1927.

W. A. SCHATZ

COOLER ATTACHMENT

Filed Oct. 24, 1925

1,648,594

WITNESSES
Edw. Thorpe

INVENTOR
William A. Schatz
BY
ATTORNEYS

Patented Nov. 8, 1927.

1,648,594

UNITED STATES PATENT OFFICE.

WILLIAM A. SCHATZ, OF NEW YORK, N. Y.

COOLER ATTACHMENT.

Application filed October 24, 1925. Serial No. 64,681.

My invention relates to a cooler and more particularly is intended for coolers for syrups and other substances more or less thick, the ingredients of which have a tendency to gravitationally separate, whereby the heavier matter settles at the bottom and the lighter oils rise to the top.

The general object of my invention is to provide a novel and effective stirrer which will maintain the syrups and other substances in the form of a homogeneous and uniform mixture.

An object further is to provide a stirrer that will be automatic in its action and operate effectively with the opening of the faucet for drawing off a given quantity of the syrup in dispensing the same.

The nature of my invention and its distinguishing features and advantages will clearly appear as the description proceeds.

Reference is to be had to the accompanying drawings forming a part of this specification, it being understood that the drawings are merely illustrative of one example of the invention.

Figure 1:
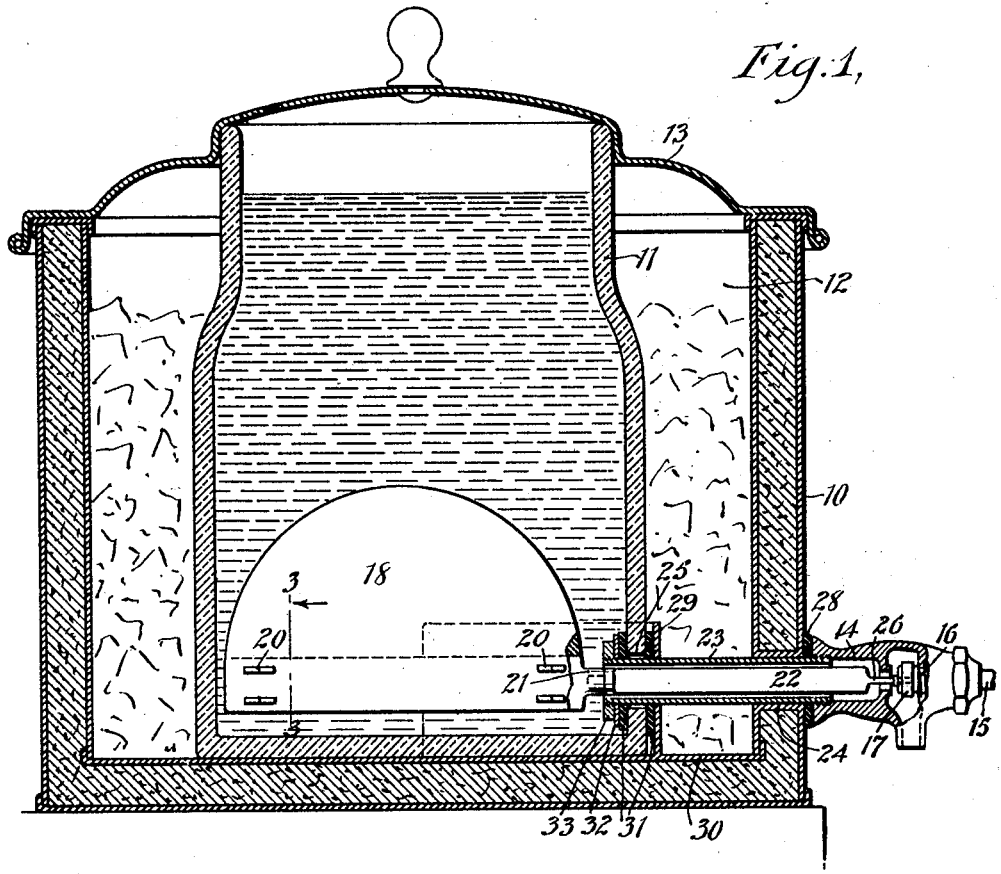
Figure 1 is a vertical section of a cooler equipped with my improved stirrer.

In carrying out my invention in accordance with the illustrated example, a cooler vessel 10 of suitable form is provided and an inner container 11 for syrup or other liquid to be dispensed, there being an intervening space 12 to receive ice. A cover 13 is provided extending over the vessel 10, the space 12 and the liquid container 11.

A faucet 14 of any suitable make is employed on the vessel 10, the numeral 15 indicating the valve stem thereof, said stem in practice having a suitable handle (not shown). On the valve stem 15 is a screw thread 16 the turning of which stem and screw closes and opens the ordinary valve 17.

A stirrer blade 18 advantageously of sector-shape in practice is slitted at its lower end and in the illustrated form receives a narrow carrying plate 19 secured thereto by transverse fasteners 20. Said plate 19 has a short shank 21 to which is fastened an operating rod 22 extending through a bushing 23 which bushing passes through a transverse hole 24 in the vessel 10 and through a registering hole 25 in the liquid container 11. The operating rod 22 has a short stem 26 threaded into the valve 17 to move with said valve and said stem having a jamb nut 27 to hold it firmly to the valve 17.

A fluid-tight joint is established, in the example shown, between the faucet 14 and the outer surface of the vessel 10 by a washer or packing 28. To establish a fluid-tight joint between the container 11 and the bushing 23, use is here made of an arcuate upstanding member 29 which is rigid with the bottom 30 of the vessel 10, said member being disposed in the ice space 12. Packings or washers 31 are disposed respectively at the interior and exterior of the container 11 at the hole 25, and a washer 32 and nut 33 complete the joint.

Figure 2:
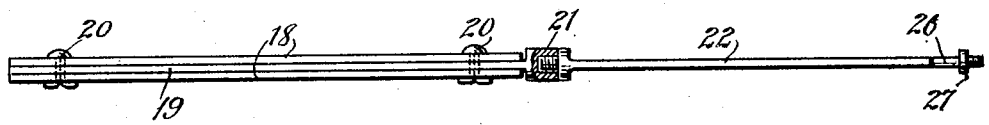
Figure 2 is an improved plan view and of the stirring blade and its operating rod.
Figure 3:
Figure 3 is an enlarged detail in vertical section on the line 3—3, Figure 1.

It will be observed by comparing Figures 1 and 2 that the operating rod 22 is flat and is of a width to lie at its edges close to the inner surface of the bushing 23 and thereby said operating rod will prevent accumulation of the syrup on the walls of the bushing to prevent clogging thereof, such as would be likely to occur if the operating rod 22 were round.

The movement permitted the valve 17 in the valve chamber or space provided therefor in the faucet 14 is such that the screw 16 can give such an amplitude of movement to the valve as will result in a movement of the stirrer 18 through an arc of approximately 180° in order that the faucet may not be operated to an extent that will result in forcing the stirrer against the bottom of the container 11 with the liability of breaking or damaging the stirrer.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A container adapted to hold liquid, a tubular element forming a passage for the outflow of liquid from the container, a faucet controlling the discharge from said passage, a stirrer in said container, and a non-circular operating rod connected with the faucet operating means and extending through said tubular element to said stirrer for operating the same, said operating rod having its edges lying close to the walls of said tubular element to dislodge an adhering substance.

2. A structure of the class described including a container adapted to hold liquid, a stirrer in said container, a faucet adapted to draw liquid from the container, means to operate the stirrer with the operation of the faucet, and means to limit the opening or closing movement of the faucet to an arc of substantially 180° to thus prevent contact of the stirrer with the bottom of the container.

3. The combination with a container adapted to hold a liquid, of a stirrer in said container, and a discharge tube lying in the plane of the axis of said stirrer and affording outflow of liquid from the container, said stirrer having plano-convex edges, the plane edge lying adjacent the axis of the stirrer; together with means to turn said stirrer through an arc of substantially 180°.

WILLIAM A. SCHATZ.